United States Patent [19]
Effing et al.

[11] Patent Number: 5,238,725
[45] Date of Patent: Aug. 24, 1993

[54] METHOD FOR FORMING A STRUCTURAL PANEL WITH DECORATIVE FACING AND PRODUCT THEREOF

[75] Inventors: Michael J. Effing, Neu-Anspach, Fed. Rep. of Germany; Dennis A. Nollen, Newark; Richard K. Okine, Wilmington, both of Del.; Albertus P. Walrave, Karben, Fed. Rep. of Germany

[73] Assignee: E. I. Du Pont de Nemours and Company, Wilmington, Del.

[21] Appl. No.: 631,436

[22] Filed: Dec. 21, 1990

[51] Int. Cl.⁵ .............................................. B32B 3/12
[52] U.S. Cl. ..................................... 428/116; 156/292; 264/257
[58] Field of Search ................. 156/245, 292, 322; 264/255, 257, 320, 321, 324; 428/116, 285, 308.4, 241, 310.5, 192, 73, 117, 118

[56] References Cited

U.S. PATENT DOCUMENTS

| | | | |
|---|---|---|---|
| 2,673,371 | 3/1954 | Uhlig | 264/237 |
| 4,013,810 | 3/1977 | Long | 264/321 |
| 4,101,628 | 7/1978 | Wiik | 264/325 |
| 4,304,751 | 12/1981 | Li et al. | 264/322 |
| 4,374,800 | 2/1983 | Gartland | 264/519 |
| 4,390,489 | 6/1983 | Segal | 264/126 |
| 4,598,007 | 7/1986 | Kourtides et al. | 428/116 |
| 4,921,647 | 5/1990 | Stewart | 264/26 |
| 4,931,340 | 6/1990 | Baba et al. | 428/192 |
| 4,937,021 | 6/1990 | Danforth et al. | 264/26 |
| 4,954,382 | 9/1990 | Riefler et al. | 428/116 |
| 5,043,127 | 8/1991 | Brambach | 264/257 |
| 5,087,500 | 2/1992 | Kasper et al. | 428/116 |
| 5,137,768 | 8/1992 | Lin | 428/116 |

FOREIGN PATENT DOCUMENTS

| | | | |
|---|---|---|---|
| 0133188 | 2/1985 | European Pat. Off. | |
| 0264495 | 4/1988 | European Pat. Off. | |
| 0269148 | 6/1988 | European Pat. Off. | |
| 0300521 | 1/1989 | European Pat. Off. | |
| 0400599 | 12/1990 | European Pat. Off. | 428/116 |
| 2143463 | 2/1985 | United Kingdom | |
| 2188866 | 4/1986 | United Kingdom | 428/116 |

*Primary Examiner*—Henry F. Epstein

[57] ABSTRACT

A panel having a honeycomb core and thermoplastic resin facings with adhered decorative polyvinyl fluoride overlayer is shaped in a press after being preheated to the softening temperature of the resin and the placing of the heated thermoplastic resin facing in registry with the overlayer which is preheated, thus pressing the two together in the press.

3 Claims, 5 Drawing Sheets

METHOD FOR FORMING A STRUCTURAL PANEL WITH DECORATIVE FACING AND PRODUCT THEREOF

BACKGROUND OF THE INVENTION

This invention relates to a method for forming a contoured shape from a structural panel having a core faced with thermoplastic resin facings and a decorative film adhered to at least one facing.

Contoured sandwich panels for interiors of commercial aircraft have been made with facings composed with reinforcing fibers such as glass, carbon and p-aramid in thermoset resins like phenolics or epoxies and core materials of either honeycomb or foam. One technique to make contoured panels is to hand-lay up high performance pre-impregnated fabrics of phenolic or epoxy resin on either side of the core and form the assembly in a press operation. Under applied pressure the panel will be cured at temperatures between 125° C. and 175° C. for approximately 60 to 90 minutes. After the curing cycle the panels are placed on a cooling fixture to control the dimensional tolerances.

Most of the interior panels will then be decorated with decorative laminate films (DECLAM). DECLAM usually consists of the following components: clear TEDLAR ™ polyvinyl fluoride (PVF) film layer for cleanability, silk screen inks for color design, opaque TEDLAR ™ PVF film and an embossing layer for texture. Sometimes DECLAM includes a fiber reinforced layer for extra stability/strength. The processing temperature of decorative laminates should not exceed 100° C.

Sometimes the DECLAM already incorporates adhesives to support the bonding to the panel. In most of the cases, an additional adhesive, like Bostic 7132, an isocynate activated adhesive, is sprayed onto the contoured panel before DECLAM is applied. The decorated laminate and the panel are placed in a vacuum forming tool before the whole package is rolled into an IR-oven for the final curing.

In comparison to thermosets, high performance thermoplastic matrix resin offer not only toughness and low flammability but also the possibility of melting and re-melting the resin to accomplish the above-mentioned steps of forming and decorating in a one step process.

SUMMARY OF THE INVENTION

It has now been found that thermoplastic resin faced core structures can be used as intermediate products to form a final decorated product in one step within minutes. The sandwich panels which are used have been made with honeycomb core and thermoplastic face sheets without the use of solvents or extra adhesives for bonding of facesheets and core material. The low fabrication time for shaping and decorating results in saving production costs. Due to the thermoplastic nature of the facings, the shaped panels provide excellent flammability and damage tolerance properties.

Flat composite sandwich panels comprised of facings with high performance fibers, either unidirectional, woven, discontinuous or combinations with a thermoplastic matrix system bonded to a core without the use of an adhesive layer to form the bond between the facesheets and the core, can be formed and decorated with decorative laminate films in a one step operation on conventional presses. The process takes only a few minutes and lower fabrication costs than thermoset technology.

Useful cores are honeycomb structures of aramid paper and foams such as polymethacrylimide and polyetherimide foams or polyvinylchloride, polyurethane and polyisocyanurate foams, and/or combinations of the above.

Combinations of core materials are used for edge trimming and insert applications. Most of the aircraft interior parts with honeycomb core are edge-trimmed (meaning picture framed) with a closed cell foam for sealing of the sandwich as well as for design purposes. Foam inserts in honeycomb structures are used to support local attachments.

Suitable thermoplastic resins for the resin facings include polyesters, polyamides, copolyamides polyolefins and polyetherketoneketone (PEKK) both amorphous and semicrystalline. Polyetheretherketone (PEEK) Stabar ™ from ICI, polyetherimide PEI) Ultem ™ from G.E. and polyethersulfone (PES) Radel ™ X from Amoco.

Useful fibers for reinforcing the resin facings are carbon aramid and glass fibers, while the decorative laminate films are selected from polyvinylfluoride films.

BRIEF DESCRIPTION OF THE DRAWINGS

FIG. 5a is a cross sectional view of FIG. 5 taken along line 5a—5a.

DETAILED DESCRIPTION OF THE PREFERRED EMBODIMENT

Figure 1:
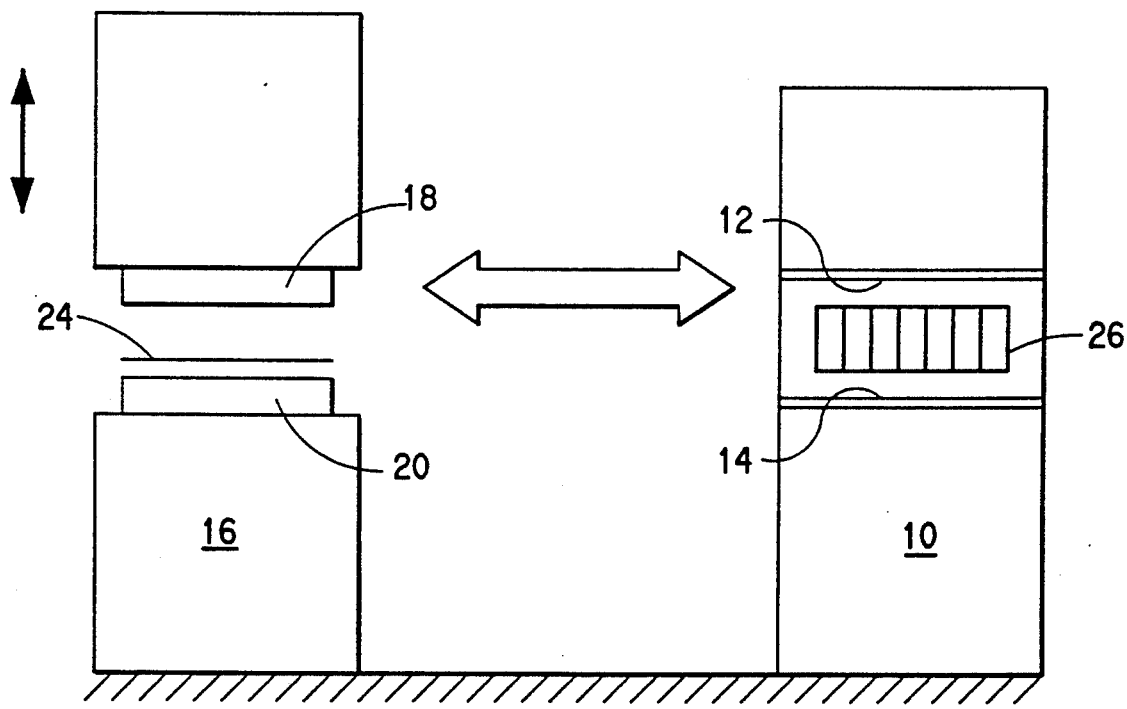
FIG. 1 is a schematic illustration representative of the method for shaping and decorating panels.

In FIG. 1, the apparatus used in the method for forming a contoured shape and decorating the contoured shape is shown to include a high energy heat source 10 (e.g., infrared oven, radiant panels, heated platens, etc.) having upper and lower heating surfaces 12 and 14, respectively, and a press 16 having upper and lower heated platens 18 and 20, respectively. A decorative laminate film 24 is shown laying on the lower heated platen 20 of the press and a resin faced cored panel 26 is shown in "oven" 10.

Figure 4:
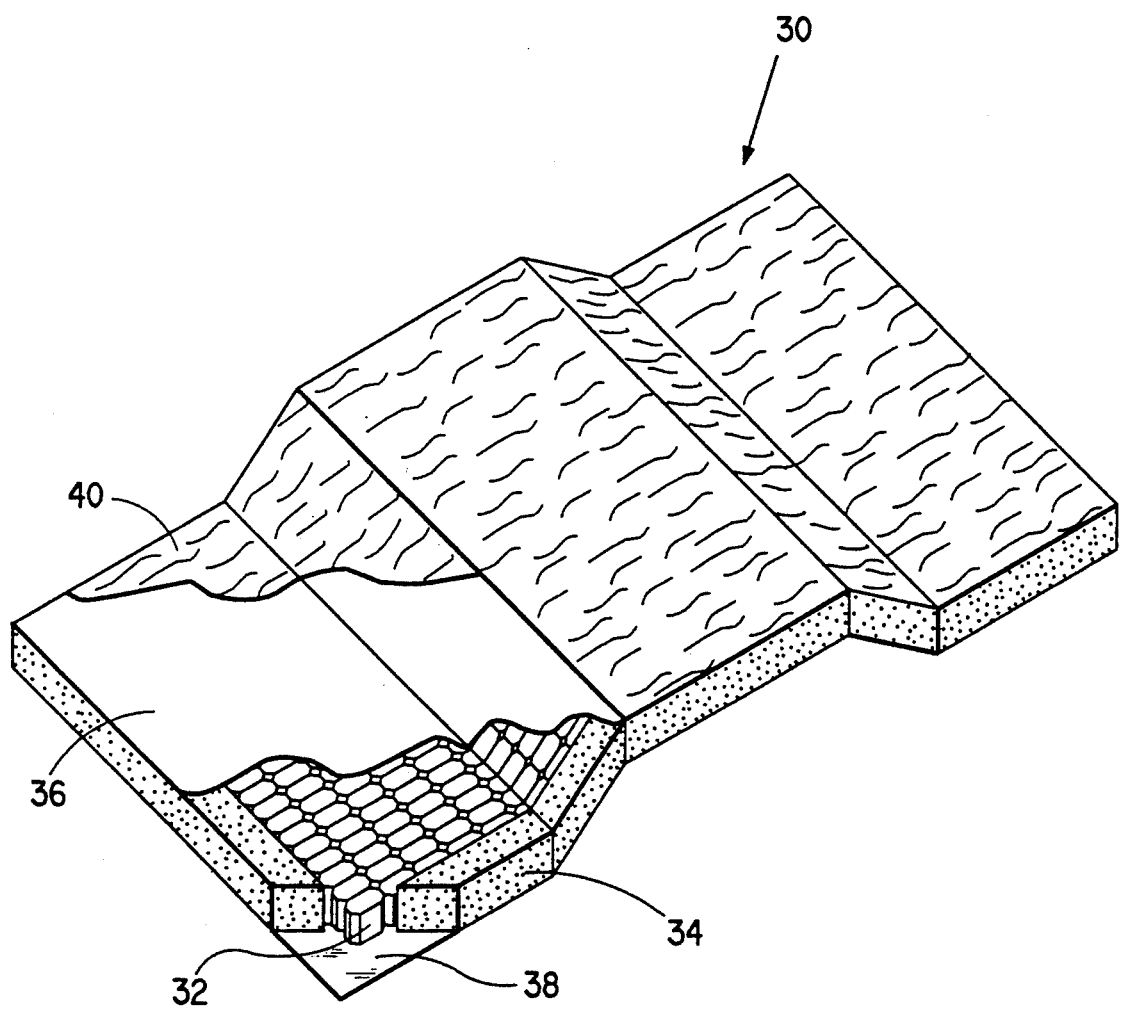
FIG. 4 is a schematic illustration partially in a cross section of a contoured shape formed according to this invention.

The forming operation starts with a placement of the panel 26 into oven 10. The panel 26 consists of fiber reinforced thermoplastic resins and honeycomb core, with optional foam inserts and edge-trimming, which are thermally bonded to each other without the use of an adhesive. FIG. 4 is an illustration of a contoured hat-shape composite 30 formed according to this invention. The composite includes a honeycomb core 32 edge trimmed with a foam edging 34. The edge trimmed core fiber reinforced thermoplastic resin facesheets 36, 38 bonded to the core and a decorative film 40 adhered to facesheet 36.

Time and processing temperature are strictly related to the materials which are combined to form the panel.

Figure 2:
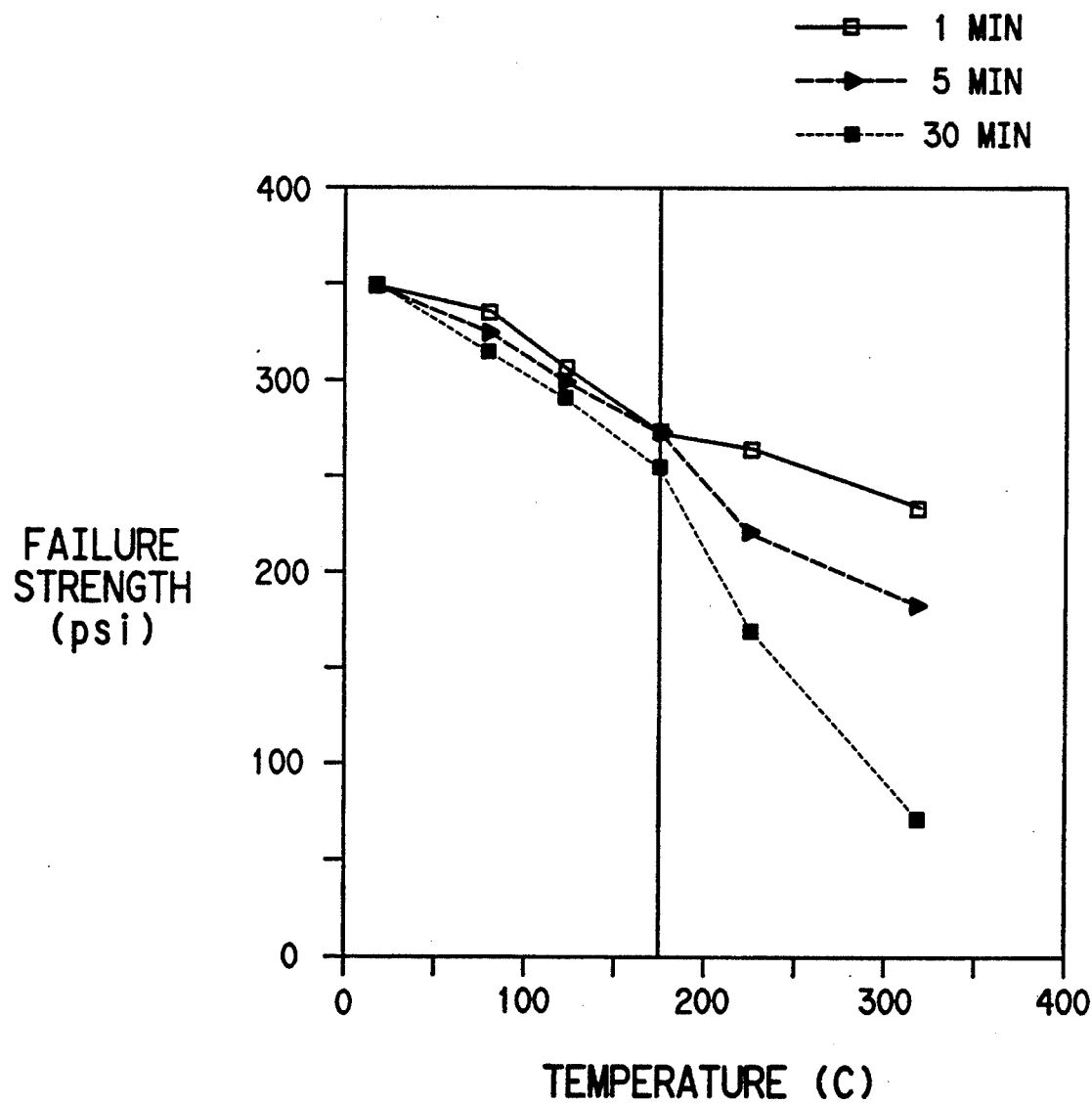
FIG. 2 is a graph of the compressive strength to failure of an aramid paper honeycomb core material as a function of time and temperature.

It has been found that high energy heating sources are needed to provide sufficient temperatures to melt the resin of the facesheets without exposing the core materials for too long a time above their maximum processing temperature. The residual compressive strength of the core material is strictly related to its time/temperature history. For example, the compressive strength of the aramid paper honeycomb core, measured by ASTM C365-57, will decrease dramatically above 180° C. if the core was exposed for a period of 30 minutes (FIG. 2).

In the case of using high temperature thermoplastic resins, like polyetherketoneketone (PEKK), for the facesheets, it has been found that suitable processing temperatures for the sandwich panels are in the range of 150°-400° C., measured at the facesheets of the panel.

The heater capacity should be optimized so that the facings reach the processing temperatures in less than 240 seconds. In this time frame, the core material works as an insulator (low heat transfer rate) and will not be significantly degraded but will allow better flexibility for the shaping without crushing the cell structures.

Table 1 gives for different heating rates the final corresponded core temperatures, when the processing temperatures for the facesheets (PEKK/Glass 7781) have to be in the range of 250°-350° C. It is obvious that for the shortest heating times the differences the facesheet and core temperatures are the greatest, whereas after 240 seconds to core temperature is only 15°-23° C. below the facesheet temperature.

TABLE 1

| Heating Time | Final Temperature of Face Sheet | Final Temperature in the Center of the Core | ΔT |
| --- | --- | --- | --- |
| 30 seconds | 250°-350° C. | 95°-155° C. | 155°-195° C. |
| 60 seconds | 250°-350° C. | 155°-250° C. | 95°-100° C. |
| 120 seconds | 250°-350° C. | 190°-290° C. | 60° C. |
| 180 seconds | 250°-350° C. | 215°-320° C. | 30-35+ C. |
| 240 seconds | 250°-350° C. | 225° C.-335° C. | 15°-25° C. |

0.5" honeycomb core, 3 pcf; ¼ inch cell
Glass/7781 reinforced PEKK-facesheets
One layer of fabric on each side; 40% resin by weight It has been found that, if these time/temperature relations for core and facesheet material can be achieved across the panel, a one-step forming of compex shaped parts (like stowage bin doors, ceiling or sidewall panels) is possible.

Figure 3:
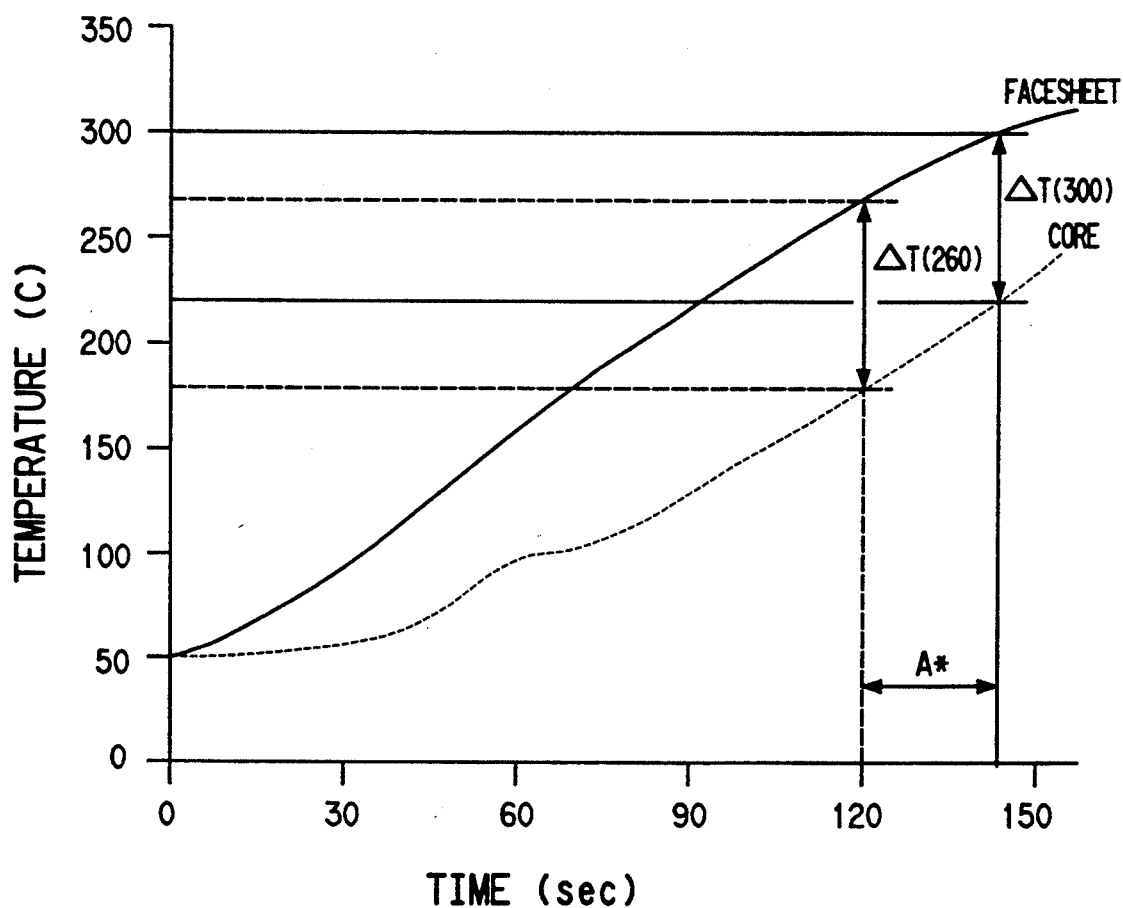
FIG. 3 is a graph of the temperature relationship between an aramid paper honeycomb core and the resin facesheet bonded to the core.

FIG. 3 shows a typical record of the temperature profiles for the facesheets and the center of the aramid paper honeycomb core (3 pcf honeycomb; 0.5 inch thick). After 120 seconds the temperature of the Kevlar TM /PEKK facings have reached 260° C. whereas the center of the core is at 180° C. At these processing conditions, the panel can be shaped If higher processing temperatures are required, the facesheets can be heated, for example, up to 300° C. The final core temperature will be increased to 220° C. In this time frame A of 20-25 seconds, called "thermal spiking", the core will not significantly degrade.

DECORATION

Normally the high processing temperatures for the thermoplastic facings (e.g., 260°-300° C. for PEKK) do not allow the application of DECLAM. This invention, however, describes a one-step process whereby a flat sandwich panel can be postformed and decorated with DECLAM in one step. The idea is to separate the high heating in the IR-Oven for the facesheets from the low heating of the DECLAM on top of the mold (FIG. 1).

The first step is the heating of the facesheets to processing temperatures of about 150° C. to 400° C. Nearly 20 seconds before the panel is moved to the mold, a sheet of decorative laminate 24 cut to the size of the mold is placed on the lower platen 20. The mold has to be in the range of between 75° C. and below 150° C. With the DECLAM clamped in place, the preheated panel is thermoformed in to the final shape in the press 16 at pressures in the range of from about 50 psi to about 90 psi. Immediate cooling under pressure with air and water is essential to achieve adhesion of the DECLAM to the facings of from about 0.3 to 7 pounds per inch of width.

EXAMPLE 1

Figure 5:
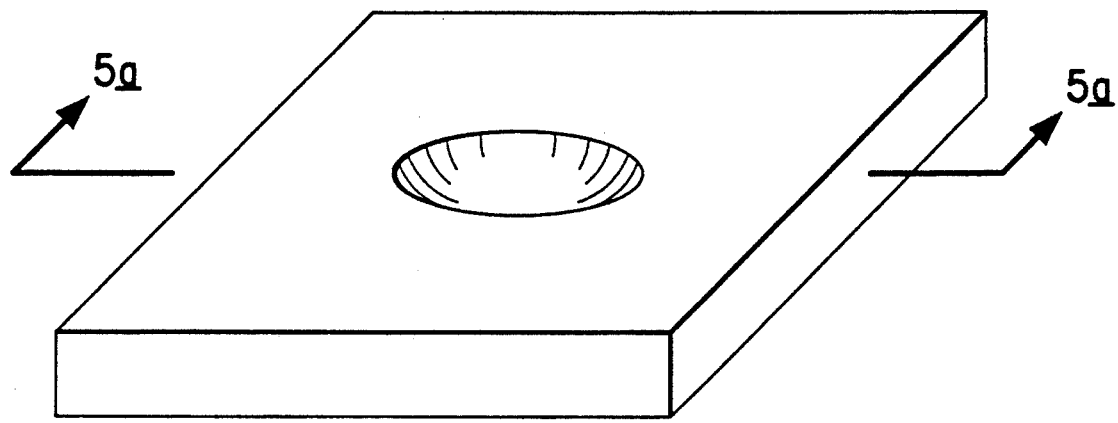
FIG. 5 is a perspective view of the female mold used in Example 4.
Figure 5A:
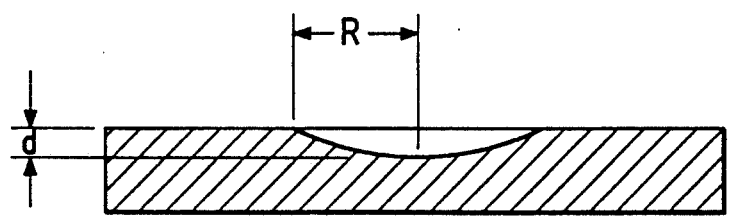

The components of the laminate were laid up in the following manner. Two pieces of amorphous PEKK film were placed on each side of a glass style 7781 fabric to form the facing. The resin content was 40% by weight. Identical facings were layed up on each side of a piece of Nomex TM honeycomb (3 pcf, ¼ inch thick, ⅛ inch cell) to achieve a sample size of 16.5×16.5 inches. The warp direction of the fabric was aligned perpendicular with the ribbon direction of the core. The panel was then consolidated by heating to about 650° F. under pressure less than the compressive strength of the core for a time of less than 2-3 minutes and cooling to form a composite structure. The panel was next heated to 260° C., measured at the surface of the facesheets, for 80 seconds in an IR-oven. The oven is designed by Du Pont using quartz lamps of 5 W/cm² from W Lanchak. The final core temperature in the center was measured at 195° C. After heating the panel is transferred within less than 5 seconds to the mold. Within 20 seconds before removal from the IR-oven, a 16.5×16.5 piece of DECLAM LHR with adhesives HA210 is placed with Kapton TM tape (1 inch wide) on the bottom portion of the mold. The mold temperature was set at 100° C. The parabolic mold has a radius of 6 inches and a depth of 1.26 inches (FIG. 5). During forming a constant pressure of 87 psi was applied. Immediately after forming, on a Shuler 100 tons hydraulic press, the mold was cooled with both air and water for 1.5 minutes to 30° C.

Four 1×6 inch strips were cut along the perimeter of the parabolic panel. The samples were tested on an 1125 Instron machine using hydraulic clamps (pressure of 80 psi) and a crosshead speed of 12 inches per minute. To test for DECLAM adhesion the bottom honeycomb structure was placed in hydraulic clamps. The DECLAM was initially started with a 0.5 inch tab. This was placed in the top clamp. The average peel strength of the decorative laminate to the facesheet of the samples was about 1.49 pounds per inch width as measured by the method for measuring ply adhesion according to ASTM D82554.

A comparative thermoset laminate was laid up in this manner. Two pieces of glass/phenolic prepreg Type 6209-18-2 from Ciba Geigy with a resin content of 40% by weight (area weight of 8.9 ounces per square yard) were placed on each side of Nomex TM honeycomb (3 pcf, ¼ inch thick, ⅛ inch cell). The warp direction of the fabric was aligned perpendicular with the ribbon direction of the core. This hand laid-up was placed on top of the parabolic mold. The mold temperature was set to 100° C. They lay-up was cured at 78 psi for 90 minutes. After opening the mold, a piece of 16.5×16.5 inch DECLAM, same as above, was applied to the bottom mold.

At 100° C. the part and the DECLAM were bonded by 80 psi pressure for an additional 5 minutes.

The panels were cut and tested in the same manner as the thermoplastic panels above. The average peel strength was about 0.33 pounds per inch width as measured by ASTM D-82554. Therefore, the one-step thermoplastic DECLAM product shows a comparatively higher peel adhesion of the decorative laminates by a factor of 4.6.

It is important to recognize the peel adhesion of the DECLAM and thermoplastic facesheet of about 1.49 pounds per inch width is lower than the adhesion between core and facesheets. This will aid in the replacement of the DECLAM without costly replacement to the panel itself. This will help should retrofitting be needed based on new interior design. Should this occur, a new piece of DECLAM can be welded onto already existing thermoplastic panels. This will be another cost saving device over thermosets.

Along with better adhesion, a tremendous reduction in processing time for shaping and decorating (3 minutes to 5 minutes for thermoplastic configuration vs. 60 to 100 minutes for the thermoset) leads to lower manufacturing cost.

EXAMPLE 2

The components of the laminate were laid up in the following manner. Two pieces of amorphous PEKK film were placed on each side of a Kevlar TM fabric 285 (from Clark Schwebel) to form the facing. The resin content was 50% by weight. Identical facings were placed on each side of a piece of Nomex TM honeycomb (3 pcf, ¼ inch thick, ⅛ inch cell) to achieve a sample size of 16.5×16.5 inches. The warp direction of the fabric was aligned perpendicular with the ribbon direction of the core. The panel was then consolidated as described in Example 1.

The panel was next heated to 260° C. for 80 seconds in an IR-oven. The oven was designed by Du Pont using quartz lamps of 5 W/cm$^2$ from W. Lanchak. The final temperature of the core was measured in the center at 195° C. After heating, the panel is transferred within 5 seconds to the mold. Within 20 seconds before removal from the IR-oven, a 16.5×16.5 piece of DECLAM LHR with adhesive HA210 is placed with Kapton TM tape (1 inch wide) on the bottom portion of the mold. The mold temperature was set at 100° C. The parabolic mold (FIG. 5) has a radius of 6 inches and a depth of 1.26 inches. During forming a constant pressure of 82 psi was applied. Immediately after forming, on a Shuler 100 ton hydraulic press, the part was cooled with both air and water for 2 minutes to 30° C.

Four 1×6 inch strips were cut along the perimeter of the parabolic panel. The samples were tested on an 1125 Instron machine using hydraulic clamps (pressure of 80 psi) and a crosshead speed of 12 inches per minutes. To test for DECLAM adhesion the bottom honeycomb structure was placed in hydraulic clamps. The DECLAM was initially started with a 0.5 inch tab. This was placed in the top clamp. The average peel strength of the DECLAM to the facesheet of the samples was about 2.11 pounds per inch width (ASTM D82554).

A comparative thermoset laminate was laid up in this manner. Two pieces of Kevlar TM /phenolic prepreg Type 6209-181 from Ciba Geigy with a resin content of 50% by weight (area weight 5.1 ounces/square yard) were placed on each side of Nomex TM honeycomb (3 pcf, ¼ inch thick, ⅛ inch cell). The warp direction of the fabric was aligned perpendicular with the ribbon direction of the core. This hand laid-up was placed on top of the parabolic mold. The mold temperature was set to 100° C. The lay-up was cured at 80 psi for 90 minutes. After opening the mold a piece of 16.5×16.5 inch DECLAM was applied to the bottom mold. At 100° C. and the DECLAM were bonded by 80 psi pressure for an additional 5 minutes.

The panels were cut and tested in the same manner as the thermoplastic panels above. The average peel strength was about 0.57 pound per inch width (ASTM D82554). Therefore, the one-step thermoplastic DECLAM product shows a comparatively higher peel adhesion of the decorative laminates by a factor of 3.7.

Along with better adhesion, a tremendous reduction in processing time for shaping and decorating (3 minutes to 5 minutes for thermoplastic configuration vs. 60 to 100 minutes for the thermoset) leads to lower manufacturing cost.

EXAMPLE 3

The components of the laminate were laid up in the following manner. Two pieces of amorphous PEKK film were placed on each side of a Kevlar TM 285 to form the facing. The resin content was 50% by weight. Identical facings were placed on each side of a piece of 6"×11" Nomex TM honeycomb (3 pcf, ½ inch thick, ⅛ inch cell) surrounded by a picture frame of Rohacell TM WF200 foam (½ inch thick, 1.5 inch wide) for edge-trimming (FIG. 6). The warp direction of the fabric was aligned perpendicular with the ribbon direction of the core. The panel was then consolidated according to Example 1

The panel was next heated to 300° C. for 80 seconds in an IR-oven. The oven was designed by Du Pont using quartz lamps of 5 W/cm$^2$ from W. Lanchak. The final temperature of the core was measured in the center at 220° C. After heating the panel is transferred within less than 5 seconds to a hat-shaped mold to form a part similar to that described in FIG. 4. Within in 20 seconds before removal from the IR-oven, a 6"×11" piece of DECLAM LHR with the adhesive HA211 is placed with Kapton TM tape (1 inch wide) on the bottom portion of the mold. The mold temperature was set at 100° C. During forming a constant pressure of 82 psi was applied. Immediately after forming, on a Shuler 100 ton hydraulic press, the mold was cooled with both air and water for 2 minutes to 30° C. Both honeycomb core andedge-trimmed foam were formed very uniformly.

EXAMPLE 4

The components of the laminate were layed up in the following manner. Two pieces of amorphous PEKK film (150 MI as measured by ASTM-1238/79 procedures) were placed on each side of a Kevlar TM fabric 285 (from Clark Schwebel) to form the facing. The resin content was 50% by weight. Identical facings were placed on each side of a piece of Nomex TM honeycomb (3 pcf, ¼ inch thick, ⅛ inch cell) to achieve a sample size of 16.5×16.5 inches. The warp direction of the fabric was aligned perpendicular with the ribbon direction of the core. The panel was consolidated according to Example 1.

The consolidated panel was then placed on a handling mechanism which transfers into the IR-oven. The oven was designed by Du Pont using quartz lamps of 5 W/cm$^2$ from W. Lanchak. The panel was heated to 260° C. for 80 seconds with a heater capacity of 70%. The final temperature of the core was measured in the center at 195° C. After heating the panel is transferred via the handling mechanism within less than 5 seconds to the mold. A 16.5×16.5 inch piece of Kevlar TM spun-bonded material was then placed on the bottom of the parabolic mold (FIG. 5) to create an embossed effect to the panel surface. Within 20 seconds before removal, the preheated panel from the IR-oven a 16.5×16.5 piece of DECLAM is placed with Kapton TM tape (1 inch wide) was positioned on the bottom portion of the mold on top of the spun-bonded Kevlar TM fabric. The mold temperature was set at 100° C. The parabolic mold has a radius R of 6 inches and a depth C of 1.26 inches.

During forming, on the Shuler 100 ton hydraulic press, a constant pressure of 92 psi was applied. Immediately after forming the mold was cooled with both air and water for 2 minutes to 30° C. The addition of the spun-bonded Kevlar TM fabric will reduce intensive shine that can occur on the decorative polyvinylflouride materials. This spun-bonded fabric will also create an embossed effect to the panel surface. With mold temperatures between 75° C. and 150° C. the spun-bonded fabric can be easily removed from the decorative surface.

Four 1"×6" strips were cut along the perimeter of the parabolic panel. The samples were tested on an 1125 Instron machine using hydraulic clamps (pressure of 80 psi), and a crosshead speed of 12 inch/minute. To test for DECLAM adhesion the bottom honeycomb structure was placed in hydraulic clamps. The DECLAM was initially started with 0.5 inch tab. This was placed in the top clamp. The average peel strength of the DECLAM to the facesheet of the samples was about 2.43 lbs per inch width.

What is claimed is:

1. A composite structure comprising a honeycomb core member of aramid paper having bonded to one of its faces a facesheet comprising fiber reinforced thermoplastic resin and an adhered decorative polyvinyl fluoride overlayer, said decorative overlayer having a peel adhesion of from about 1.5 to 2.5 pounds per inch of width.

2. A method for bonding a polyvinyl fluoride film to a thermoplastic facing bonded to a honeycomb core member of aramid paper of a panel and molding the panel to form a laminated shaped structure, said method comprising: heating the thermoplastic facing of the panel to a temperature in the range of from about 150° C. to about 400° C. within 30 to 240 seconds; placing the panel in a mold configured to said shaped structure; heating a sheet of polyvinyl fluoride film in a separate heating step to a temperature of from about 75° C. to about 150° C.; placing said sheet in registry with the thermoplastic facing; pressing the panel and the film together to form a laminated shaped structure; and cooling said structure.

3. The method of claim 2 wherein the thermoplastic facing and sheet of polyvinyl fluoride film are pressed together at a pressure of from about 50 to about 90 psi.

* * * * *